United States Patent

Suzuki et al.

(10) Patent No.: US 10,879,574 B2
(45) Date of Patent: Dec. 29, 2020

(54) LITHIUM AIR BATTERY SYSTEM

(71) Applicant: DENSO CORPORATION, Kariya (JP)

(72) Inventors: Yosuke Suzuki, Kariya (JP); Kan Kitagawa, Kariya (JP); Hidehiko Hiramatsu, Kariya (JP)

(73) Assignee: DENSO CORPORATION, Kariya (JP)

(*) Notice: Subject to any disclaimer, the term of this patent is extended or adjusted under 35 U.S.C. 154(b) by 165 days.

(21) Appl. No.: 16/071,149

(22) PCT Filed: Mar. 6, 2017

(86) PCT No.: PCT/JP2017/008693
§ 371 (c)(1),
(2) Date: Jul. 19, 2018

(87) PCT Pub. No.: WO2017/159420
PCT Pub. Date: Sep. 21, 2017

(65) Prior Publication Data
US 2019/0267687 A1 Aug. 29, 2019

(30) Foreign Application Priority Data

Mar. 17, 2016 (JP) .................. 2016-053519
Nov. 11, 2016 (JP) .................. 2016-220488

(51) Int. Cl.
*H01M 12/02* (2006.01)
*H01M 4/48* (2010.01)
*H01M 12/08* (2006.01)

(52) U.S. Cl.
CPC .......... *H01M 12/02* (2013.01); *H01M 4/483* (2013.01); *H01M 12/08* (2013.01); *Y02E 60/10* (2013.01)

(58) Field of Classification Search
CPC ...... H01M 12/02; H01M 12/06; H01M 12/08; H01M 4/483; Y02E 60/128
See application file for complete search history.

(56) References Cited

U.S. PATENT DOCUMENTS

2017/0222287 A1  8/2017  Suzuki

FOREIGN PATENT DOCUMENTS

| JP | 2011-096586 A | 5/2011 |
|----|---------------|--------|
| JP | 2014-225344 A | 12/2014 |

OTHER PUBLICATIONS

English translation of JP 2014-225344 (Year: 2014).*

* cited by examiner

*Primary Examiner* — Christopher P Domone
*Assistant Examiner* — Kimberly Wyluda
(74) *Attorney, Agent, or Firm* — Posz Law Group, PLC

(57) ABSTRACT

A lithium air battery system includes: a lithium air battery that includes a negative electrode made of a negative electrode material for absorbing and releasing a lithium ion, a positive electrode made of a positive electrode material and including a catalyst for reducing oxygen which is positive electrode active material, and a solid electrolyte layer including a solid electrolyte interposed between the negative electrode and the positive electrode; and a humidity control unit that adjusts a humidity of gas which includes oxygen and contacts with at least the positive electrode. The humidity control unit adjusts the humidity of the gas based on a temperature of the lithium air battery at least during operation of the lithium air battery.

16 Claims, 12 Drawing Sheets

LITHIUM AIR BATTERY SYSTEM

CROSS REFERENCE TO RELATED APPLICATIONS

This application is a U.S. national stage application of International Application No. PCT/JP2017/008693 filed on Mar. 6, 2017 and is based on Japanese Patent Applications No. 2016-53519 filed on Mar. 17, 2016, and No. 2016-220488 filed on Nov. 11, 2016, the disclosures of which are incorporated herein by reference.

TECHNICAL FIELD

The present disclosure relates to a lithium air battery system including a lithium air battery.

BACKGROUND

In recent years, with the development of portable devices such as personal computers and mobile phones, a demand for batteries as power sources of the portable devices has greatly expanded. In order to realize a battery with a larger capacity, researches on lithium air batteries using oxygen in air as a positive electrode active material are under way. The lithium air battery has high energy density.

It is reported that the lithium air battery exhibits a very large discharging capacity since there is no need to fill the lithium air battery with the positive electrode active material.

For example, the lithium air battery includes a positive electrode layer that contains a conductive material, a catalyst, and a binder, a positive electrode current collector that collects current from the positive electrode layer, a negative electrode layer that is made of a metal or an alloy, a negative electrode current collector that performs a current collection of the negative electrode layer, and an electrolyte that is interposed between the positive electrode layer and the negative electrode layer. The lithium air battery is thought to undergo charging and discharging reactions as follows.

[During Discharging]
Negative Electrode: $Li \rightarrow Li^+ + e^-$
Positive Electrode: $2Li^+ + O_2 + 2e^- \rightarrow Li_2O_2$
[During Charging]
Negative Electrode: $Li^+ + e^- \rightarrow Li$
Positive Electrode: $Li_2O_2 \rightarrow 2Li^+ + O_2 + 2e^-$ Up to now, as the electrolyte of the battery, an electrolytic solution in which a supporting electrolyte salt is dissolved in an organic solvent is used. The electrolytic solution using the organic solvent as a medium has a high ion conductivity.

However, in order to prevent the organic solvent from burning, the lithium air battery using the electrolytic solution needs to be improved in structure and material for the purpose of installing a safety device for reducing a temperature rise during short circuit and of preventing the short circuit. In addition, since the organic solvent is volatile, in a lithium air battery that has a structure to take the air into the battery and operates by taking oxygen in the air into the positive electrode, it is conceivable that there is a problem with stability in long-term operation. In other words, in long-term operation of the lithium air battery, the electrolytic solution may be volatilized from the positive electrode. As the electrolytic solution is volatilized, it is expected that the lithium air battery will increase a battery resistance and a battery performance will be remarkably deteriorated.

On the other hand, an all solid-state air battery in which the electrolytic solution is changed to a solid electrolyte does not use the organic solvent in the battery. Further, an ion conductivity of the solid electrolyte is improved by a temperature rise. Therefore, the all solid-state air battery can simplify the safety device for preventing the temperature rise, and is excellent in the manufacturing cost and the productivity. Further, in the all solid-state air battery, there is no possibility that the organic solvent is volatilized from the positive electrode. Therefore, a reduction in the battery performance due to the volatilization of the organic solvent can be prevented.

Patent Literature 1 discloses a lithium air battery including a negative electrode, a positive electrode having a catalyst for oxygen reduction and a first solid electrolyte layer, and a second solid electrolyte layer disposed between the negative electrode and the positive electrode. Patent Literature 1 also discloses that the first solid electrolyte layer and the second solid electrolyte layer are not physically separated from but continuous to each other. However, since an organic electrolytic solution and an aqueous electrolytic solution are required on an air electrode surface, a reduction in the performance caused by the volatilization of the organic electrolytic solution and the aqueous electrolytic solution cannot be prevented.

In view of the problem with the volatilization of those electrolytic solutions, a battery configured so as not to require the aqueous solution and the electrolyte has also been studied.

PATENT LITERATURE

Patent Literature 1: JP-2011-96586-A

SUMMARY

It has been known that in the conventional lithium air battery, an overvoltage occurs during charging after discharging. When the overvoltage occurs, the battery capacity decreases and the performance of the lithium air battery is reduced. This makes it difficult to stably charge and discharge the lithium air battery.

It is an object of the present disclosure to provide a lithium air battery system that is capable of performing stable charge and discharge.

According to an aspect of the present disclosure, a lithium air battery system includes: a lithium air battery that includes a negative electrode made of a negative electrode material for absorbing and releasing a lithium ion, a positive electrode made of a positive electrode material and including a catalyst for reducing oxygen which is positive electrode active material, and a solid electrolyte layer including a solid electrolyte interposed between the negative electrode and the positive electrode; and a humidity control unit (5, 7) that adjusts a humidity of gas which includes oxygen and contacts with at least the positive electrode. The humidity control unit adjusts the humidity of the gas based on a temperature of the lithium air battery at least during operation of the lithium air battery.

According to the lithium air battery system described above, the humidity of the gas is controlled based on the temperature of the lithium air battery during the operation of the lithium air battery, thereby being capable of properly maintaining a lithium ion conductive layer formed on the surface of the reaction product due to the discharge in correspondence with a change in the lithium battery temperature. This makes it possible to stably charge and discharge the lithium air battery within the operating temperature range of the lithium air battery.

BRIEF DESCRIPTION OF DRAWINGS

The above and other objects, features and advantages of the present disclosure will become more apparent from the following detailed description made with reference to the accompanying drawings. In the drawings.

EMBODIMENTS

First Embodiment

Figure 1:
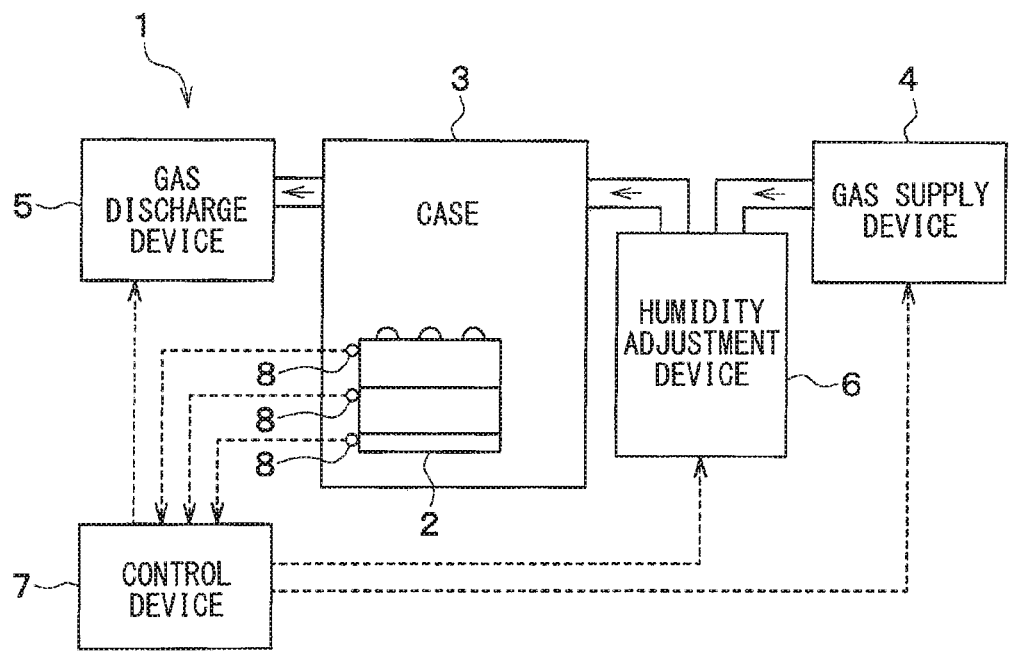
FIG. 1 is a diagram showing a configuration of a lithium air battery system according to a first embodiment.

Hereinafter, a lithium air battery system according to an embodiment of the present disclosure will be described in detail. As shown in FIG. 1, a lithium air battery system 1 according to the present embodiment includes a lithium air battery 2, a gas supply device 4, a gas discharge device 5, a humidity adjustment device 6, a control device 7, and the like. Although not shown, the lithium air battery system 1 also includes members necessary for the configuration of the lithium air battery system 1, such as conductors and electrode terminals connected to electrodes of the air battery 2.

Figure 2:
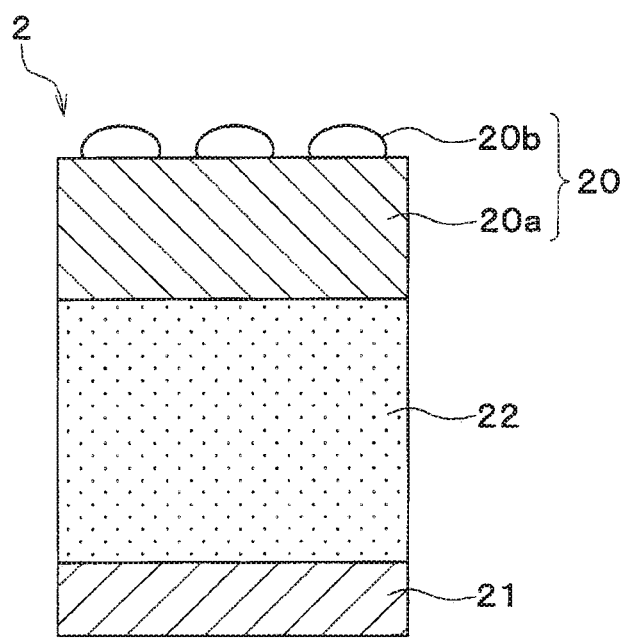
FIG. 2 is a configuration diagram schematically showing a configuration of the lithium air battery.

As shown in FIG. 2, the lithium air battery 2 (hereinafter referred to as "air battery 2") includes a positive electrode 20, a negative electrode 21, and a solid electrolyte layer 22. The positive electrode 20 is also called an air electrode.

The air battery 2 may be a primary battery or a secondary battery. Preferably, the air battery 2 is a chargeable and dischargeable secondary battery.

The air battery 2 according to the present embodiment is configured as a laminate in which the positive electrode 20, the negative electrode 21, and the solid electrolyte layer 22 are laminated on each other. The air battery 2 need not be the laminate.

A contour of the air battery 2 is not particularly limited as long as a gas containing oxygen can be brought into contact with the positive electrode 20. As the shape (configuration) by which the gas can be brought into contact with the positive electrode 20, a shape having a gas intake port can be exemplified. The contour of the air battery 2 can include a desired shape such as a cylindrical shape, a square shape, a button shape, a coin shape, a flat shape or the like.

The positive electrode 20 is made of a positive electrode material including a solid electrolyte 20$a$ and a catalyst 20$b$. The positive electrode material has the solid electrolyte 20$a$ as a base material and has holes into which a gas (that is, a gas containing oxygen) can be introduced. The catalyst 20$b$ is disposed on a surface (that is, inner surfaces of the holes) of the solid electrolyte 20$a$.

The solid electrolyte 20$a$ can be selected from solid electrolytes that can be used for the solid electrolyte layer 22. It is preferable that the solid electrolyte 20$a$ is made of the same inorganic solid electrolyte as the solid electrolyte selected for the solid electrolyte layer 22. Since the solid electrolyte 20$a$ is made of the same electrolyte as the solid electrolyte forming the solid electrolyte layer 22 described above, the solid electrolyte layer 22 and the positive electrode material forming the positive electrode 20 can be coupled to each other by the same solid electrolyte, thereby being capable of obtaining the air battery which is easily manufactured and has a low interface resistance.

The catalyst 20$b$ promotes a reaction (that is, a reduction reaction) of oxygen which is a positive electrode active material in the positive electrode 20. As the oxygen of the positive electrode active material, oxygen (oxygen contained in the atmosphere) existing around the air battery 2 (particularly, the positive electrode 20) is used.

The catalyst 20$b$ is exemplified by one kind or two or more kinds selected from a group consisting of silver, palladium, gold, platinum, aluminum, nickel, titanium, an iridium oxide, a ruthenium oxide, a manganese oxide, a cobalt oxide, nickel oxide, iron oxide, copper oxide, and metal phthalocyanines. In the present embodiment, platinum is used as the catalyst 20$b$.

The positive electrode material includes a conductive material as necessary. The conductive material is not particularly limited as long as the conductive material has conductivity. It is necessary for the conductive material to have necessary stability under an atmosphere in the air battery 2. Further, it is preferable that the conductive material used for integration with the positive electrode 20 or the negative electrode 21 is a material suitable for firing. For example, it is preferable to use a metal or an alloy having high oxidation resistance. The metal or alloy having the high oxidation resistance is preferably silver, palladium, gold, platinum, aluminum, nickel, titanium or the like as long as the conductive material is a metal. In the case of the alloy, it is preferable to use an alloy including two or more kinds of metals selected from silver, palladium, gold, platinum, copper, aluminum and nickel. Oxides of those metals may also be used.

The positive electrode 20 has a positive electrode current collector not shown in addition to the positive electrode material described above. The positive electrode current collector may be any one having electrical conductivity. Since the positive electrode 20 needs a means for introducing a gas containing oxygen into the positive electrode material, it is preferable that the positive electrode current collector is formed to be capable of transmitting oxygen. For example, it is preferable that the positive electrode current collector is made of a porous material, a mesh, or a punching metal including a metal such as stainless steel, nickel, aluminum, or copper. In the case of using the porous material or the like, it is preferable to fill holes in the porous material with a conductive material, a catalyst, and the like.

The negative electrode 21 is made of a negative electrode material containing a negative electrode active material capable of absorbing and releasing lithium ions. In addition to the negative electrode active material, the negative electrode material may include a solid electrolyte and a conductive material. The negative electrode current collector can be made of, for example, copper, nickel or the like in the form of a net, a punched metal, a foam metal, a plate, a foil or the like. The negative electrode current collector may also serve as a battery casing.

The negative electrode active material is one or more kinds of materials selected from a group consisting of metal lithium, a lithium alloy, a metal material capable of absorbing and releasing lithium, an alloy material capable of absorbing and releasing lithium, and a compound capable of absorbing and releasing lithium. The alloy material is used as a concept including not only an alloy consisting of only a metal but also an alloy of a metal and a metalloid. The structure of the alloy material includes a solid solution, an eutectic (that is, an eutectic mixture), an intermetallic compound, or a mixture of two or more of those materials. As will be described later, since a positive electrode portion, a solid electrolyte portion, and a negative electrode portion are formed by integral firing, the negative electrode active material is preferably a material suitable for firing. In addition, when Li metal is used, Li can be introduced by inserting the Li material into the negative electrode in which a Li metal dissolving and precipitating portion is formed or electrochemically precipitating the LI material.

A metal element and a metalloid element which can make the metal material and the alloy material can be exemplified by tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Those alloy materials or compounds include those represented by a chemical formula $Ma_fMb_gLi_h$ or a chemical formula $Ma_sMc_tMd_u$. In those chemical formulas, Ma represents at least one kind of metallic elements and metalloid elements capable of forming an alloy with lithium, Mb represents at least one kind of metallic elements and metalloid elements other than lithium and Ma. Mc represents at least one kind of nonmetallic elements, and Md represents at least one kind of metal elements and metalloid elements other than Ma. Also, $f>0$, $g\geq0$, $h\geq0$, $s>0$, $t>0$, $u\geq0$ are satisfied.

Among those materials, the negative electrode material is preferably a simple substance, an alloy or a compound of a metal element or a metalloid element of Group 4B in the short period periodic table, particularly preferably silicon (Si) or tin (Sn), an alloy or compound of those elements. Those materials may be crystalline or amorphous.

As a material capable of absorbing and releasing lithium, further metal compounds such as oxides, sulfides, lithium nitrides such as $LiN_3$ can be exemplified. Examples of oxides include $MnO_2$, $V_2O_5$, $V_6O_{13}$, NiS, MoS, and the like. Besides, examples of oxides which are relatively low in potential and capable of absorbing and releasing lithium include iron oxide, ruthenium oxide, molybdenum oxide, tungsten oxide, titanium oxide, tin oxide and the like. Examples of sulfides include NiS, MoS, and the like.

The solid electrolyte contained in the negative electrode material is used as necessary. It is preferable to use the same inorganic solid electrolyte as the solid electrolyte selected for the solid electrolyte layer 22 as the solid electrolyte contained in the negative electrode material. Since the solid electrolyte contained in the negative electrode material is made of the same electrolyte as the solid electrolyte forming the solid electrolyte layer 22 described above, the solid electrolyte layer 22 and the negative electrode material of the negative electrode 21 can be bonded to each other with the same solid electrolyte, thereby being capable of obtaining the air battery which is easily manufactured and has a low interface resistance.

The negative electrode material includes a conductive material as necessary. As the conductive material of the negative electrode material, the conductive material exemplified for the positive electrode 20 can be used.

The negative electrode 21 has a negative electrode current collector not shown in addition to the negative electrode material described above. The negative electrode current collector may be any one having electrical conductivity. For example, materials such as copper, stainless steel, or nickel can be mentioned. Examples of the shape of the negative electrode current collector include a foil shape, a plate shape and a mesh (grid) shape.

The solid electrolyte layer 22 is interposed between the positive electrode 20 and the negative electrode 21 and is made of a solid electrolyte capable of conducting lithium ions. The solid electrolyte layer 22 functions as a transmission path for lithium ions to move between the positive electrode 20 and the negative electrode 21. The solid electrolyte layer 22 is not limited to a single layer but may be configured by multiple layers so as to have a semi-solid electrolyte layer which will be described later.

It is preferable to use a material having no conductivity of electrons and a high conductivity of lithium ions as the solid electrolyte forming the solid electrolyte layer 22. As the solid electrolyte, it is preferable to use an inorganic material (that is, an inorganic solid electrolyte) that can be fired at a high temperature in the air atmosphere.

The inorganic solid electrolyte may be crystal, glass, a mixture of those materials, or a composite of those materials. Further, the inorganic solid electrolyte may be any inorganic solid electrolyte as long as the inorganic solid electrolyte does not cause a remarkable performance deterioration by bringing the inorganic solid electrolyte in contact with water vapor, more preferably an oxide-based inorganic solid electrolyte excellent in the atmospheric stability and suitable for high-temperature firing.

As such an oxide-based inorganic solid electrolyte, it is preferable to include at least one kind of inorganic solid electrolyte material having a crystal structure selected from a group consisting of a perovskite type, an NASICON type, an LISICON type, a thio-LISICON type, a γ-Li3PO4 type, a garnet type, and an LIPON type.

As the perovskite type oxide, for example, an oxide (Li—La—Ti—O type perovskite type oxide) represented by $Li_xLa_{1-x}TiO_3$ or the like can be exemplified.

The NASICON type oxide can be exemplified by oxide represented by $Li_aX_bY_cP_dO_e$ (X is at least one kind selected from a group consisting of B, Al, Ga, In, C, Si, Ge, Sn, Sb and Se. Y is at least one kind selected from a group consisting of Ti, Zr, Ge, In, Ga, Sn and Al. In addition, relationships of $0.5<a<5.0$, $0\leq b<2.98$, $0.5\leq c<3.0$, $0.02<d\leq 3.0$, $2.0<b+d<4.0$, $3.0<e\leq 12.0$ are satisfied). Particularly, in the above formula, oxide (Li—Al—Ti—P—O based NASICON type oxide) in which X=Al and Y'Ti are satisfied, and oxide (Li—Al—Ge—Ti—O-based NASICON type oxide) in which X=Al, Y=Ge or X=Ge, Y=Al are satisfied are preferable. $Li_{1.3}Al_{0.3}Ti_{1.7}(PO_4)_3$(LATP) which is an Li—Al—Ti—P—O based NASICON type oxide is more preferred.

The LISICON type oxide, the thio-LISICON type oxide, or the γ-Li3 $PO_4$ type oxide can be exemplified by $Li_4XO_4$—$Li_3YO_4$ (X is at least one kind selected from a group consisting of Si, Ge, and Ti; Y is at least one kind selected from a group consisting of P, As and V), $Li_4XO_4$—$Li_2AO_4$ (X is at least one selected from a group consisting of Si, Ge, and Ti; A is at least one kind selected from a group consisting of Mo and S), $Li_4XO_4$—$Li_2ZO_2$ (X is at least one kind selected from a group consisting of Si, Ge, and Ti; Z is at least one kind selected from a group consisting of Al, Ga and Cr), $Li_4XO_4$—$Li_2BXO_4$ (X is at least one kind selected from a group consisting of Si, Ge, and Ti; and B is at least one kind selected from a group consisting of Ca and Zn), $Li_3DO_3$—$Li_3YO_4$ (D is B and Y is at least one kind selected from a group consisting of P, As and V), and so on. In particular, $Li_{3.25}Ge_{0.25}P_{0.75}S_4$, $Li_4SiO_4$—$Li_3PO_4$, $Li_3BO_3$—$Li_3PO_4$ and the like are preferable.

The garnet type oxide can be exemplified by an oxide represented by $Li_{3+x}A_yG_zM_{2-v}B_vO_{12}$. In this example, A, G, M and B are metal cations. A is preferably an alkaline earth metal cation such as Ca, Sr, Ba and Mg, or a transition metal cation such as Zn. Further, G is preferably a transition metal cation such as La, Y, Pr, Nd, Sm, Lu, or Eu. Further, M can be exemplified by transition metal cations such as Zr, Nb, Ta, Bi, Te, or Sb, and in particular Zr is preferable. Also, B is preferably In, for example. It is preferable to meet $0\leq x\leq 5$, more preferable to meet $4\leq x\leq 5$. It is preferable to meet $0\leq y\leq 3$, and more preferable to meet $0\leq y\leq 2$. It is preferable to meet $0\leq z\leq 3$, and more preferable to meet $1\leq z\leq 3$. It is preferable to meet $0\leq v\leq 2$, and more preferable to meet $0\leq v\leq 1$. It is to be noted that O may be partially or completely replaced with a divalent anion and/or a trivalent anion such as N3-. The garnet type oxide is preferably a Li—La—Zr—O oxide such as $Li_7La_3Zr_2O_{12}$ (LLZ).

Examples of LiPON type oxides can include $Li_{2.88}PO_{3.73}N_{0.14}$, $Li_{3.0}PO_{2.0}N_{1.2}$ and the like.

The solid electrolyte layer 22 may further have an electrolyte layer (referred to as a semi-solid electrolyte layer) made of a semi-solid. The semi-solid electrolyte layer indicates an electrolyte layer (elastically deformable electrolyte layer) that can be changed in shape to a gel, and can be exemplified by a layer made of a non-aqueous electrolyte. The non-aqueous electrolyte that forms the semi-solid electrolyte layer may be impregnated in an insulating porous body such as a porous membrane of polyethylene, polypropylene or the like, a resin nonwoven fabric, or a glass fiber nonwoven fabric, and disposed between the solid electrolyte layer 22 and the negative electrode 21.

The non-aqueous electrolyte may also be used by adding a polymer such as polyethylene oxide (PEO), polyacrylonitrile (PAN), or polymethyl methacrylate (PMMA) and gelling the added polymer. From the viewpoint of the ion conductivity of the non-aqueous electrolyte, it is preferable to use the non-aqueous electrolyte without gelation.

Returning to FIG. 1, the air battery 2 is disposed inside the case 3. The case 3 forms a hermetically sealed space capable of accommodating the air battery 2 in the case 3. The configuration of the case 3 is not limited, and can be configured by, for example, a chamber.

The gas supply device 4 is configured so as to control a type (composition) and an inflow amount of the gas to be supplied into the case 3. For example, the gas supply device 4 can be configured by a device having a gas cylinder, a conduit for communicating the interior of the case 3 with the gas cylinder, and a valve for controlling a flow rate of the gas flowing in the conduit.

The gas to be supplied by the gas supply device 4 is not limited as long as the gas contains oxygen. The gas to be supplied by the gas supply device 4 can be exemplified by a gas such as air or pure oxygen gas.

The gas discharge device 5 is a device capable of controlling the discharge amount of the gas discharged from the inside of the case 3. The gas discharge device 5 can be exemplified by a device having a conduit for communicating the inside and the outside of the case 3 with each other and a valve for controlling the flow rate of the gas flowing in the conduit.

The gas atmosphere containing oxygen in the case 3 is adjusted by the gas supply of the gas supply device 4 and the gas discharge of the gas discharge device 5. For that reason, the gas supply device 4 and the gas discharge device 5 configure an atmosphere adjustment unit for adjusting the gas atmosphere in the case 3.

The humidity adjustment device 6 is a humidification device that humidifies the gas containing oxygen that comes in contact with the positive electrode 20 of the air battery 2. Specifically, the humidity adjustment device 6 humidifies the gas supplied from the gas supply device 4 to the interior of the case 3. The humidified gas (that is, gas containing a gaseous water) is supplied to the positive electrode 20 of the air battery 2 inside the case 3 and comes in contact with the positive electrode 20.

The humidity adjustment device 6 humidifies the gas supplied from the gas supply device 4 to supply a gaseous water (that is, water vapor) to the positive electrode 20. With the humidification of the gas by the humidity adjustment device 6, a progress of reduction of oxygen introduced into the positive electrode 20 can be performed in the presence of gaseous water.

The humidity adjustment device 6 is not particularly limited as long as the humidification amount of the gas (hereinafter also referred to as "supply gas") to be supplied to the positive electrode 20 of the air battery 2 can be adjusted. Adjustment of the humidification amount of the gas by the humidity adjustment device 6 is controlled by a control unit 7 to be described later. The humidity adjustment device 6 corresponds to a humidity control unit.

The control device 7 includes a known microcomputer having a CPU, a ROM, a RAM, and the like and peripheral circuits and various calculation processes are performed based on an air conditioning control program stored in the ROM. The control device 7 is a control unit that controls operation of the gas supply device 4, the gas discharge device 5, the humidity adjustment device 6 and the like which are connected to an output side.

The control device 7 is integrated with a control unit that controls various control target devices which are connected to the output side of the air-conditioning control device 50, and a configuration (that is, hardware and software) for controlling the operation of the respective control target devices configures the control unit that controls the operation of the respective control target devices.

Detection signals of the temperature sensor 8 and the like are input to an input side of the control device 7. The temperature sensor 8 is a temperature detection unit that detects the temperature of the air battery 2 (hereinafter also referred to as "battery temperature"). It is desirable that the temperature sensor 8 detects at least a temperature in the vicinity of the positive electrode 20 of the air battery 2.

The number of temperature sensors 8 may be one or plural. In the example shown in FIG. 1, three temperature sensors 8 are used to detect temperatures of three places of the air battery 2.

The control device 7 controls the humidity of the gas by the humidity adjustment device 6 based on the battery temperature detected by the temperature sensor 8. The control device 7 corresponds to a humidity control unit.

Figure 3:
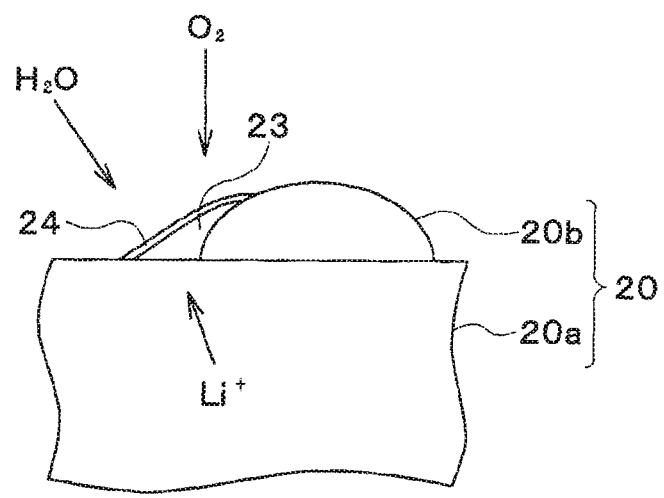
FIG. 3 is a conceptual diagram showing a reaction product in a positive electrode.

As shown in FIG. 3, in the positive electrode 20 of the air battery 2, a reaction product 23 is generated by discharging in the presence of the gas containing oxygen. The reaction product 23 is a solid and contains Li2O2.

A surface of the reaction product 23 comes in contact with a gas containing the gaseous water. For that reason, on the surface of the reaction product 23, part of the lithium contained in the reaction product 23 is bonded to a hydroxy group of water molecules to produce lithium hydroxide (LiOH).

Lithium hydroxide is water soluble, absorbs moisture in the presence of the gaseous water to form a lithium hydroxide layer. As a result, a surface ion conductive layer 24 including the lithium hydroxide layer is formed on a surface of the reaction product 23. The lithium hydroxide layer forming the surface ion conductive layer 24 is in a liquid phase mainly containing an aqueous lithium hydroxide solution, but the surface ion conductive layer 24 is not necessarily in the liquid phase.

The surface ion conductive layer 24 forms a lithium ion conductive layer in a reaction field of the positive electrode 20. As a result, when charging the air battery 2 that has been discharged, occurrence of an overvoltage in which the voltage greatly rises in the middle of a battery capacity can be prevented, and charge and discharge can be stably performed.

The magnitude of the ion conductivity of the surface ion conductive layer 24 varies based on an amount of gaseous water (that is, humidity) of the gas phase contained in the supply gas. Specifically, when the humidity of the supply gas is high, the surface liquid phase 24 is expanded, and when the humidity of the supply gas is low, the surface ion conductive layer 24 is contracted. In the present specification, the humidity means a relative humidity.

If the surface ion conductive layer 24 is extremely expanded, the reaction product 23 may be contracted and the surface ion conductive layer 24 may flow out. Further, if the surface ion conductive layer 24 is excessively contracted, there is a possibility that the charge and discharge of the air battery 2 cannot be stably performed.

For that reason, there is a need to appropriately control the humidity of the supply gas and properly maintain the surface ion conductive layer 24 during the operation of charging and discharging the air battery 2. The humidity of the supply gas can be adjusted by controlling the humidification amount by the humidity adjustment device 6.

If the gaseous water contained in the supply gas condenses on the surface of the positive electrode 20, there is a possibility that the surface ion conductive layer 24 becomes excessive. For that reason, in the present embodiment, the amount of water vapor contained in the supply gas is set to be smaller than the saturated water vapor amount at the battery temperature.

When a water vapor partial pressure of the supply gas is equal to a saturated vapor pressure (hereinafter referred to as "LiOH saturated vapor pressure") when the lithium hydroxide layer forming the surface ion conductive layer 24 becomes a saturated aqueous solution, the surface ion conductive layer 24 is in an equilibrium state. In other words, when the water vapor partial pressure of the supply gas is higher than the LiOH saturated vapor pressure, the surface ion conductive layer 24 is enlarged, and when the water vapor partial pressure of the supply gas is lower than the LiOH saturated vapor pressure, the surface ion conductive layer 24 is contracted.

Figure 4:
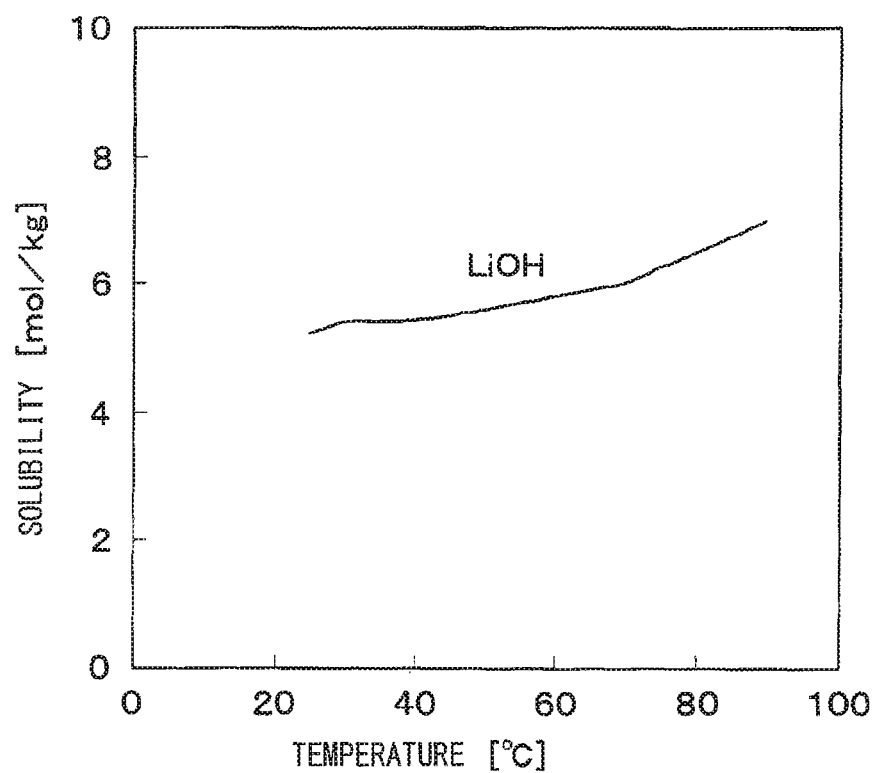
FIG. 4 is a graph showing the solubility of lithium hydroxide.

FIG. 4 shows a change in solubility of lithium hydroxide in water with a temperature change. As shown in FIG. 4, when the temperature rises, the solubility of lithium hydroxide increases.

Figure 5:
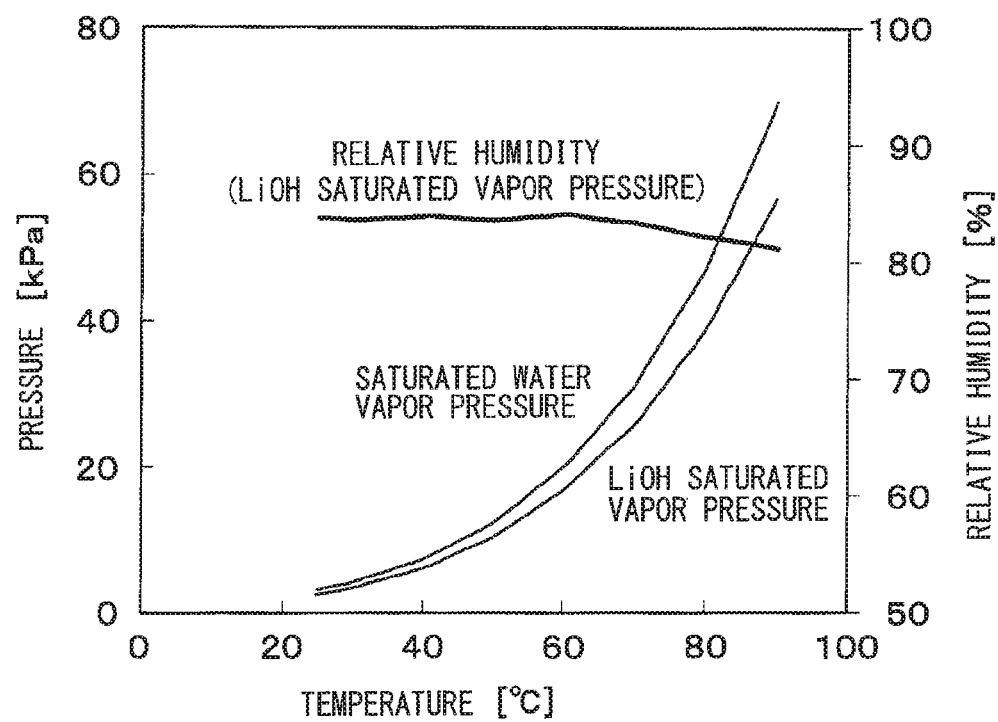
FIG. 5 is a diagram showing a saturated vapor pressure of water and a saturated aqueous lithium hydroxide solution.

FIG. 5 shows changes in the saturated water vapor pressure and LiOH saturated vapor pressure with the temperature change and the humidity corresponding to the LiOH saturated vapor pressure. As shown in FIG. 5, the saturated water vapor pressure and the LiOH saturated vapor pressure change according to the temperature change, and the saturated water vapor pressure and the LiOH saturated vapor pressure increase with the temperature rise.

The LiOH saturated vapor pressure is lower than the saturated water vapor pressure under a vapor pressure drop by the aqueous solution. In addition, since the solubility of lithium hydroxide increases when the temperature becomes high, a difference between the saturated water vapor pressure and the LiOH saturated vapor pressure is large.

Since the saturated water vapor pressure is 100% humidity, a ratio of the LiOH saturated vapor pressure to the saturated water vapor pressure is the humidity (%) corresponding to the LiOH saturated vapor pressure. As shown in FIG. 5, although the humidity varies with temperature, the humidity corresponding to the LiOH saturated vapor pressure is around 84%. For that reason, the humidity of the supply gas at the battery temperature is controlled to be around 84%, as a result of which the surface liquid phase 24 can be brought into an equilibrium state.

If the humidity of the supply gas is too low, since the surface ion conductive layer 24 is too contracted, it is desirable that the humidity of the supply gas is 60% or more. On the other hand, if the humidity of the supply gas is too high, since the surface ion conductive layer 24 is excessively enlarged, it is desirable that the humidity of the supply gas is set to 90% or less.

For that reason, in the present embodiment, the humidification amount of the supply gas by the humidity adjustment device 6 is controlled so as to fall within a range of 60 to 90% of the humidity at the battery temperature. From the viewpoint of stably maintaining the surface ion conductive layer 24 without enlarging the surface ion conductive layer 24, it is desirable that the humidification amount of the supply gas in a normal state is set to be lower than the humidity corresponding to the LiOH saturated vapor pressure. A desired humidity range of the supply gas may vary depending on the type of the catalyst 20b.

As shown in FIG. 5, the LiOH saturated vapor pressure varies with the temperature change. In the present embodiment, even when the LiOH saturated vapor pressure varies with the temperature change, the ratio of the humidity of the supply gas to the LiOH saturated vapor pressure is set to a constant value.

Further, the humidification amount of the supply gas may be set based on an intended charging and discharging current density of the air battery 2.

The charging and discharging current density of the air battery 2 is relevant with the ion conductivity of the surface ion conductive layer 24. When the ion conductivity of the surface ion conductive layer 24 increases, the charging and discharging current density of the air battery 2 increases correspondingly. When the ion conductivity of the surface ion conductive layer 24 decreases, the charging and discharging current density of the air battery 2 decreases correspondingly.

In addition, the ion conductivity of the surface ion conductive layer 24 is relevant with the humidity of the supply gas, and when the humidity of the supply gas increases, the ion conductivity of the surface ion conductive layer 24 increases correspondingly. When the humidity of the supply gas decreases, the ion conductivity of the surface ion conductive layer 24 decreases correspondingly.

In other words, the humidity of the supply gas may be set so that the ion conductivity of the surface ion conductive layer 24 becomes an ion conductivity corresponding to the intended charging and discharging current density of the air battery 2. When the intended charging and discharging current density of the air battery 2 is high, the humidity of the supply gas may be set to be high correspondingly, and when the intended charging and discharging current density of the air battery 2 is low, the humidity of the supply gas may be set to be low correspondingly.

As described above, it is not preferable from the viewpoint of stably maintaining the surface ion conductive layer 24 that the humidity of the supply gas is set to be remarkably higher than the humidity corresponding to the LiOH saturated vapor pressure. For that reason, when a high output of the air battery 2 is required, it is desirable to increase the humidification amount of the supply gas and to increase the ion conductivity of the surface ion conductive layer 24 as a temporary measure.

If the discharge amount of the air battery 2 is large, the deposition amount of the reaction product 23 on the positive electrode 20 increases. For that reason, if it is predicted that the deposition amount of the reaction product 23 on the positive electrode 20 increases, a time for increasing the humidification amount of the supply gas may be lengthened accordingly.

Figure 6:
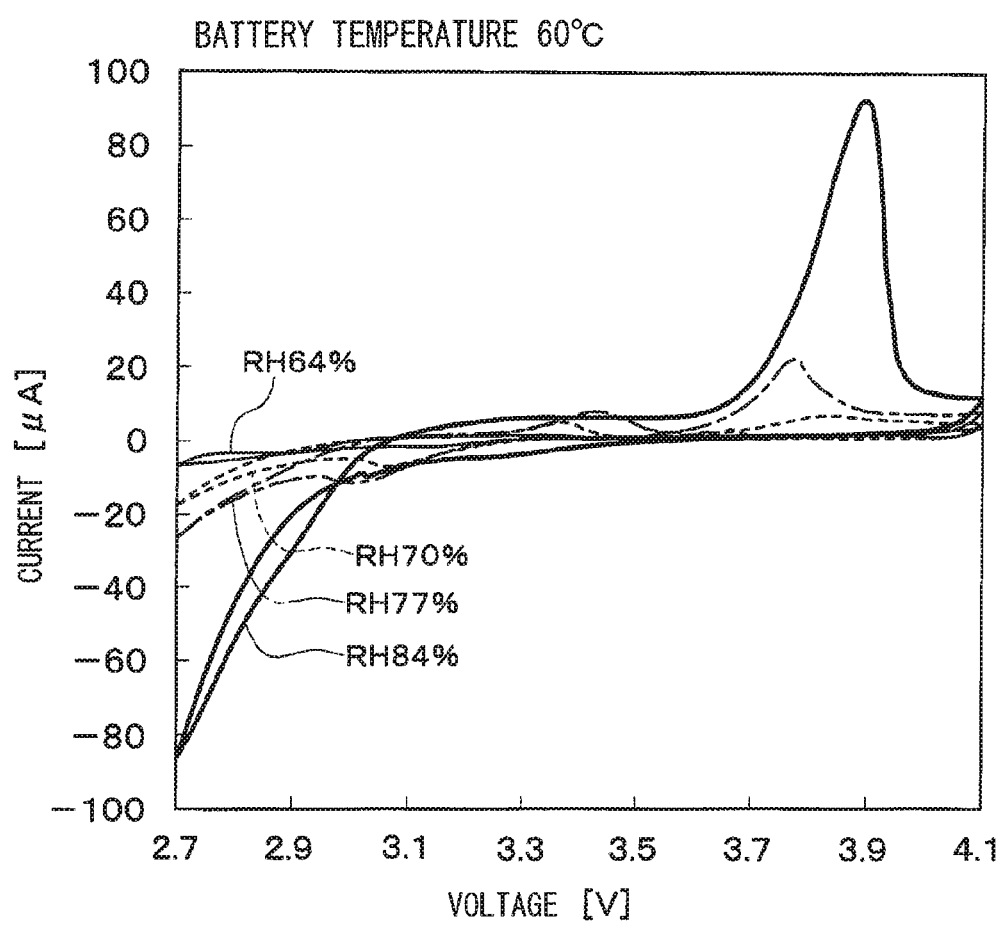
FIG. 6 is a graph showing charging and discharging characteristics of the lithium air battery at a battery temperature of 60° C.
Figure 7:
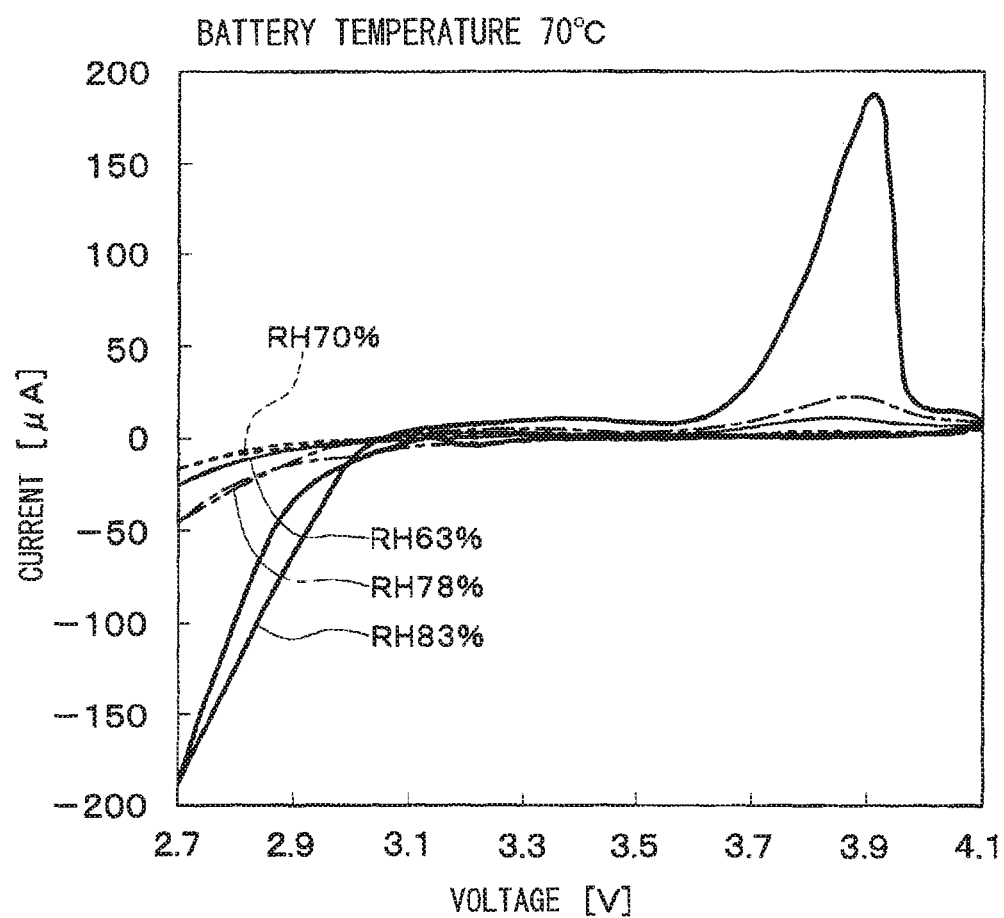
FIG. 7 is a graph showing the charging and discharging characteristics of the lithium air battery at the battery temperature of 70° C.
Figure 8:
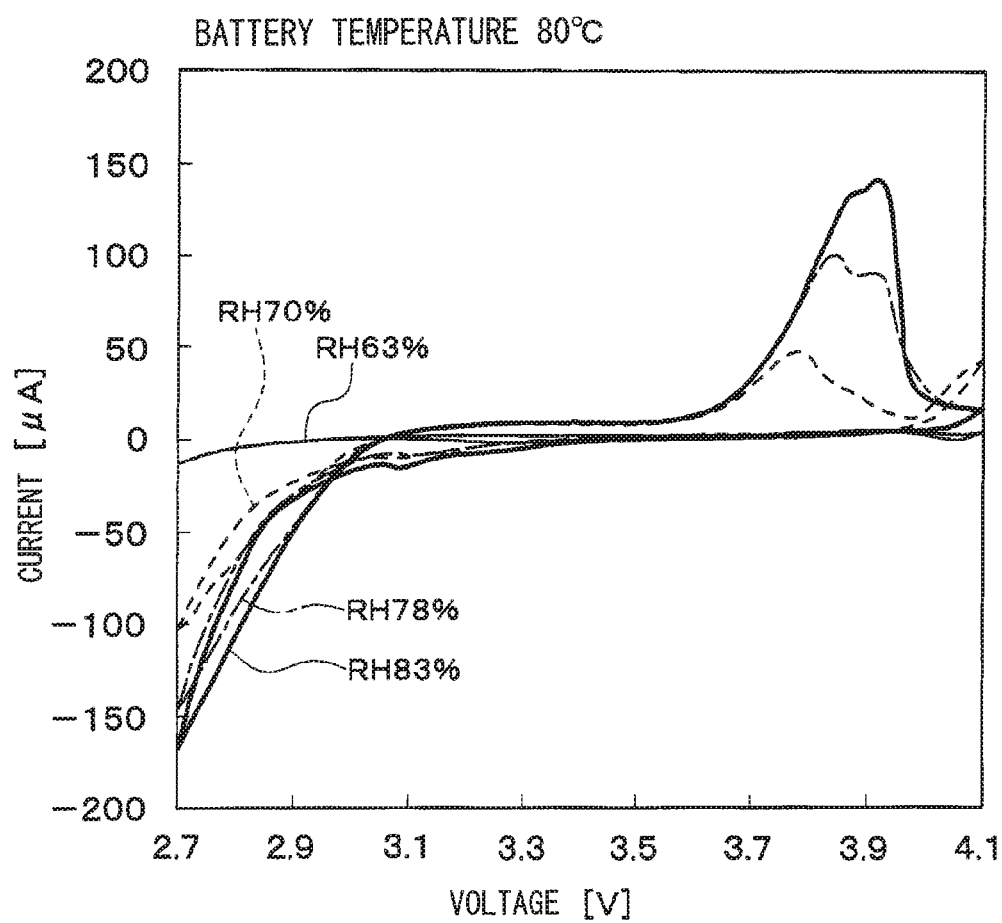
FIG. 8 is a graph showing the charging and discharging characteristics of the lithium air battery at the battery temperature of 80° C.

FIG. 6 shows charging and discharging characteristics when the humidity of the supply gas is changed at the battery temperature of 60° C. FIG. 7 shows the charging and discharging characteristics when the humidity of the supply gas is changed at the battery temperature of 70° C. FIG. 8 shows the charging and discharging characteristics when the humidity of the supply gas is changed at the battery temperature of 80° C.

As shown in FIG. 6, at the battery temperature of 60° C., when the humidity of the supply gas is controlled to be 84%, the current density is most increased. In addition, as shown in FIG. 7, at the battery temperature of 70° C., when the humidity of the supply gas is controlled to be 83%, the current density is most increased. In addition, as shown in FIG. 8, at the battery temperature of 80° C., when the humidity of the supply gas is controlled to be 83%, the current density is most increased.

Figure 9:
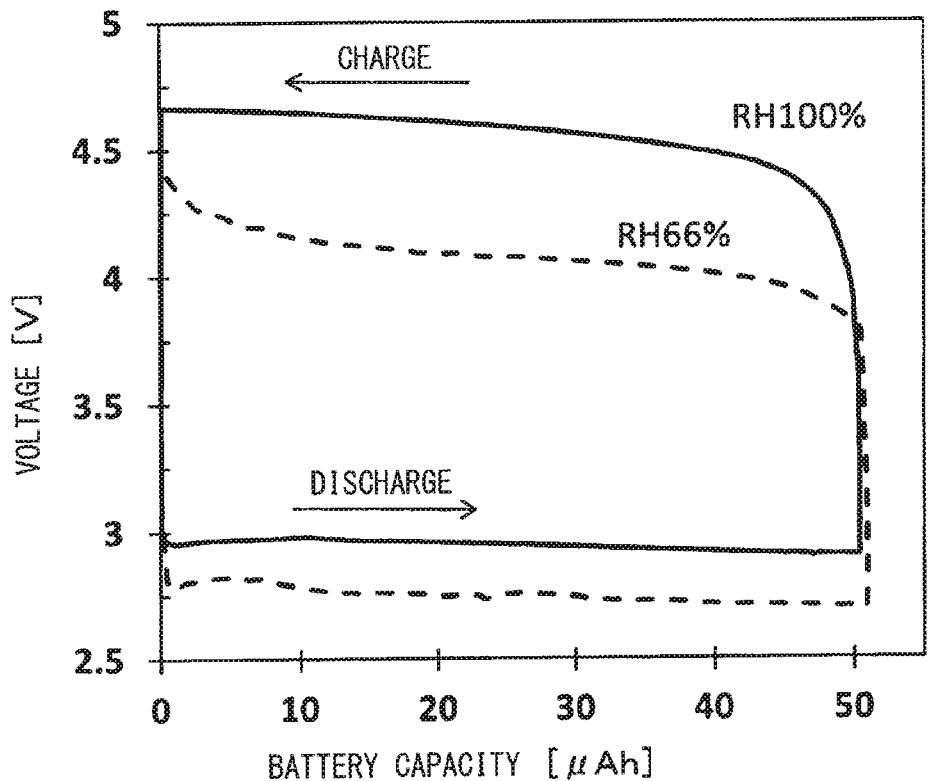
FIG. 9 is a diagram showing charging and discharging characteristics of the lithium air battery at relative humidity of 66% and 100%.

FIG. 9 shows the charging and discharging characteristics of the lithium air battery 1 of the present embodiment when the humidity of the supply gas is 66% and 100%. FIG. 9 shows changes in a discharging voltage and a charging voltage when charging the lithium air battery 1 that has been discharged at a current density of 100 µA/cm2. A difference between the charging voltage and the discharging voltage is an energy loss, and as the difference between the charging voltage and the discharging voltage is smaller, the charging and discharging efficiency is higher.

As shown in FIG. 9, when charge and discharge are performed at the humidity of 100%, the charging voltage is about 4.8 V, the discharging voltage is about 3.0 V, and the discharging voltage is lower than the charging voltage by about 1.8 V. In addition, when charge and discharge are performed at the humidity of 66%, the charging voltage is about 4.0 V, the discharging voltage is about 2.7 V, and the discharging voltage is lower than the charging voltage by about 1.3 V. In other words, the charging and discharging efficiency of the lithium air battery 1 varies depending on the humidity, and the charge and discharge efficiency when the charge and discharge are performed at the humidity of 66% is higher than that when the charge and discharge are performed at the humidity of 100%.

When the air battery 2 is not charged and discharged, the surface ion conductive layer 24 is unnecessary and it is desirable to reduce or eliminate the surface ion conductive layer 24. For that reason, when the air battery 2 is stopped, the humidity of the supply gas is lowered as compared with the operation of the air battery 2. In the present embodiment, when the air battery 2 is stopped, the supply gas is in a dry atmosphere.

Figure 10:
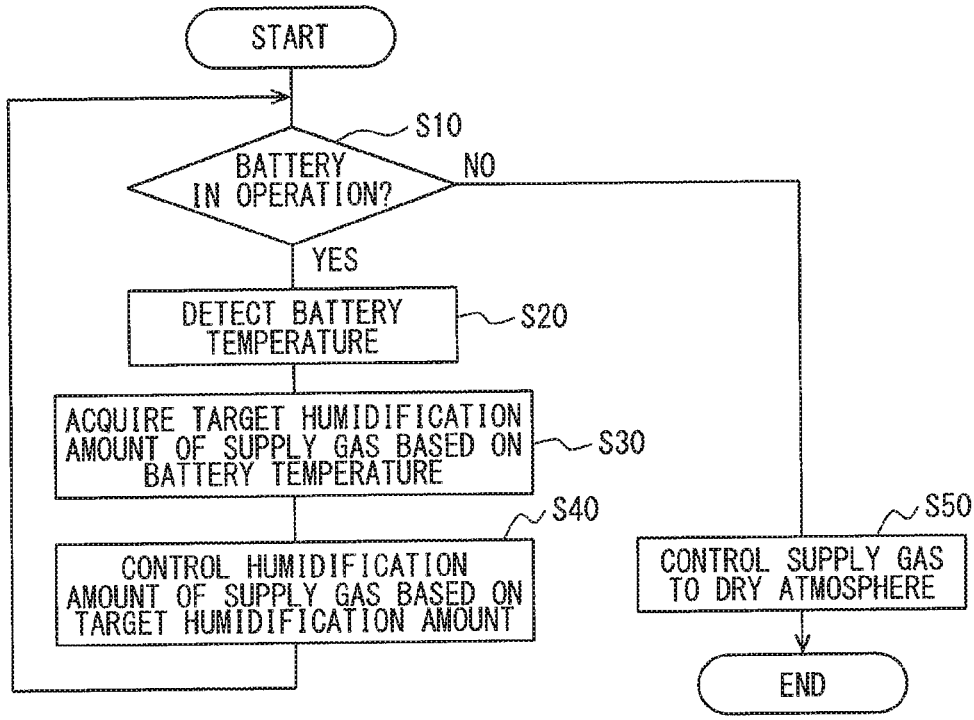
FIG. 10 is a flowchart showing a humidity control of the lithium air battery system.

Next, the supply gas humidity control of the lithium air battery system 1 will be described. As shown in FIG. 10, first, it is determined whether the air battery 2 is being charged and discharged during a process of S10, or not.

As a result, when it is determined that the air battery 2 is in operation, the battery temperature is detected with the use of the temperature sensor 8 in a process of S20.

Next, a target humidification amount of the supply gas is acquired based on the battery temperature in a process of S30. The target humidification amount of the supply gas can be obtained from the humidity corresponding to the LiOH saturated vapor pressure at the battery temperature. Then, in a process of S40, the humidification amount of the supply gas is controlled by the humidity adjustment device 6 based on the target humidification amount.

When it is determined that the air battery 2 is not in operation in the process of S10, since the air battery 2 is stopped, the humidification amount of the supply gas is controlled by the humidity adjustment device 6 so that the supply gas puts into the dry atmosphere in a process of S50.

According to the present embodiment described above, the humidity of the supply gas is controlled based on the temperature of the air battery 2 during the operation of the air battery 2, thereby being capable of properly maintaining the surface ion conductive layer 24 in correspondence with a change in the battery temperature. This makes it possible to stably charge and discharge the air battery 2 within the operating temperature range of the air battery 2.

In addition, in the present embodiment, the humidity of the supply gas is controlled based on the saturated vapor pressure of the lithium compound aqueous solution forming the surface ion conductive layer 24. As a result, the humidity of the supply gas can be set according to the type of the lithium compound forming the surface ion conductive layer 24, and the surface ion conductive layer 24 can be appropriately maintained.

Further, in the present embodiment, the saturated water vapor amount contained in the supply gas is set to be smaller than the amount of saturated water vapor at the battery temperature. As a result, the gaseous water contained in the supply gas can be prevented from being condensed on the surface of the positive electrode 20, and the surface ion conductive layer 24 can be prevented from being extremely expanded due to excessive moisture.

Further, in the present embodiment, when the air battery 2 is stopped, the humidity of the supply gas is lowered as compared with that during operation of the air battery 2. As a result, the surface ion conductive layer 24 can be prevented from expanding and flowing out when the air battery 2 is stopped.

Second Embodiment

Next, a second embodiment of the present disclosure will be described. In the second embodiment, the same parts as the first embodiment will not be repeatedly described and only different parts will be described.

Figure 11:
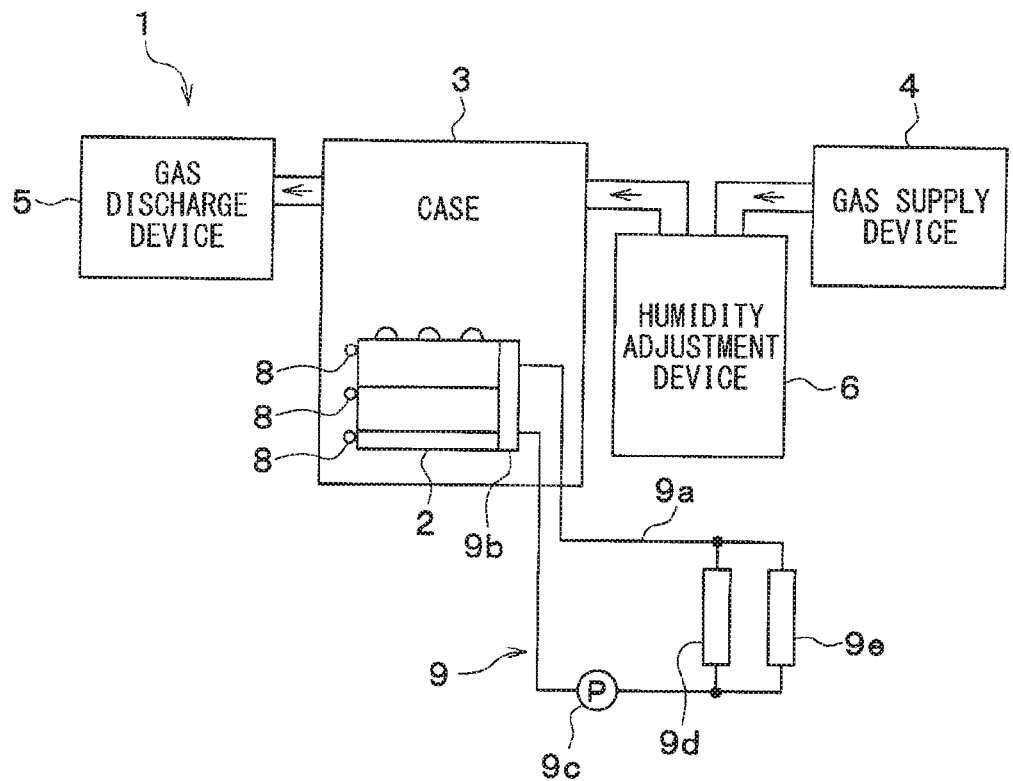
FIG. 11 is a diagram showing a configuration of a lithium air battery system according to a second embodiment.

As shown in FIG. 11, a lithium air battery system 1 according to the second embodiment includes a temperature adjusting device 9 that adjusts a temperature of an air battery 2. In FIG. 11, a control unit 7 is omitted from illustration.

The temperature adjusting device 9 includes a heat medium passage 9a through which a heat medium flows, a heat exchanger 9b that exchanges a heat between the heat medium and the air battery 2, a pump 9c that pumps the heat medium, a radiator 9d that radiates the heat medium, and a heater 9e that heats the heat medium. Furthermore, though not shown, the temperature adjustment device 9 includes a flow channel switching valve for switching a flow of the heat medium to the radiator 9d or the heater 9e, and the like. The operation of the temperature adjusting device 9 is controlled by the control unit 7.

In the second embodiment, a temperature of the air battery 2 is changed by the temperature adjusting device 9, to thereby change a LiOH saturated vapor pressure, and adjust a humidity of a supply gas. More specifically, if the humidity of the supply gas flowing into a case 3 is low, a temperature of the air battery 2 is lowered by the temperature adjusting device 9. As a result, the LiOH saturated vapor pressure at the battery temperature decreases, and the humidity of the supply gas rises. If the humidity of the supply gas flowing into the case 3 is high, the temperature of the air battery 2 is increased. As a result, the LiOH saturated vapor pressure at the battery temperature increases and the humidity of the supply gas decreases.

According to the second embodiment described above, the humidity of the supply gas is controlled by controlling the temperature of the air battery 2. As a result, the surface ion conductive layer 24 can be appropriately maintained, and the air battery 2 can be stably charged and discharged.

Third Embodiment

Next, a third embodiment of the present disclosure will be described. In the third embodiment, the same parts as the respective embodiments will not be repeatedly described and only different parts will be described.

Figure 12:
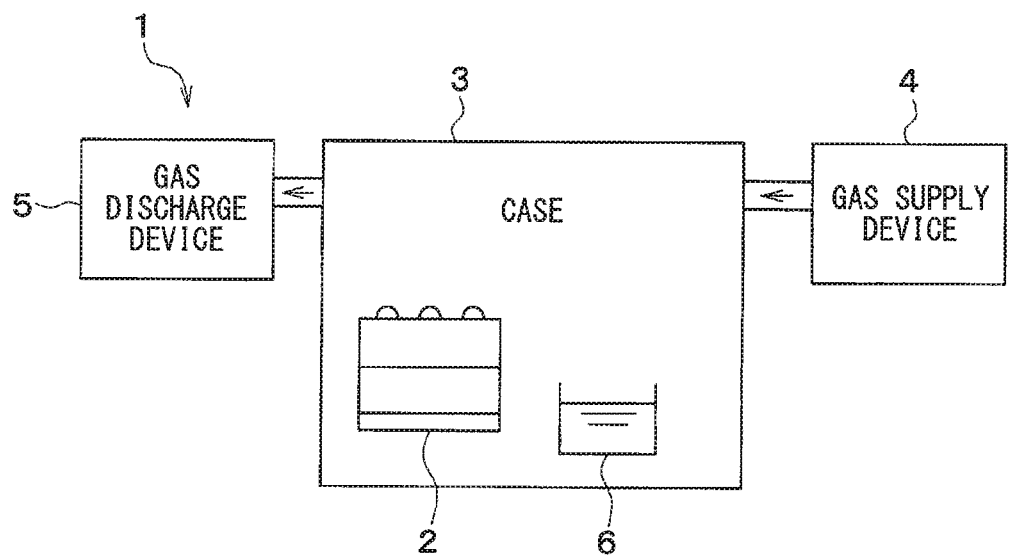
FIG. 12 is a diagram showing a configuration of a lithium air battery system according to a third embodiment.

As shown in FIG. 12, a humidity adjustment device 6 according to the third embodiment is disposed inside a case 3. In other words, the humidity adjustment device 6 is disposed in the same space as an air battery 2. The humidity adjustment device 6 includes an aqueous lithium hydroxide solution and a container for containing the aqueous solution. In FIG. 12, illustration of a control unit 7 is omitted.

The aqueous lithium hydroxide solution of the humidity adjustment device 6 is a saturated aqueous solution. The aqueous lithium hydroxide solution of the humidity adjustment device 6 is the same lithium compound aqueous solution as the lithium hydroxide aqueous solution forming a surface ion conductive layer 24.

The aqueous lithium hydroxide solution of the humidity adjustment device 6 can come into contact with the supply gas inside the case 3. The aqueous lithium hydroxide solution of the humidity adjustment device 6 functions as a humidity conditioning material for adjusting the humidity of the supply gas.

In the case where the humidity of the supply gas is higher than the humidity corresponding to the LiOH saturated vapor pressure, the gaseous water contained in the supply gas is absorbed by the aqueous lithium hydroxide solution of the humidity adjustment device 6. As a result, the humidity of the supply gas decreases and approaches the humidity corresponding to the LiOH saturated vapor pressure. On the other hand, when the humidity of the supply gas is lower than the humidity corresponding to the LiOH saturated vapor pressure, the gaseous water is released into the supply gas from the aqueous lithium hydroxide solution of the humidity adjustment device 6. As a result, the humidity of the supply gas rises and approaches the humidity corresponding to the LiOH saturated vapor pressure.

In the third embodiment described above, the same kind of aqueous lithium hydroxide solution as the aqueous lithium hydroxide solution forming the surface ion conductive layer 24 is disposed in the same space as the air battery 2. This makes it possible to adjust the humidity of the supply gas to approach the humidity corresponding to the LiOH saturated vapor pressure. Incidentally, the humidity adjustment device 6 using the aqueous lithium hydroxide solution according to the third embodiment and the humidity adjustment device 6 including the humidification device according to the first embodiment may be used together.

Fourth Embodiment

Next, a fourth embodiment of the present disclosure will be described. In the fourth embodiment, the same parts as the respective embodiments will not be repeatedly described and only different parts will be described.

In each of the above embodiments, the aqueous lithium hydroxide solution is used as the aqueous solution of the lithium compound forming the surface ion conductive layer 24. On the other hand, in the fourth embodiment, as the lithium compound aqueous solution forming the surface ion conductive layer 24, the aqueous lithium chloride solution, the aqueous lithium bromide solution or the aqueous lithium iodide solution is used.

Preliminarily attaching solid lithium chloride (LiCl), solid lithium bromide (LiBr) or lithium iodide (LiI) to the surface of the positive electrode 20, to thereby absorb a gaseous water contained in the supply gas into an aqueous lithium chloride solution, an aqueous lithium bromide solution or an aqueous lithium iodide solution so as to form the surface ion conductive layer 24. It is desirable that solid lithium chloride, solid lithium bromide or solid lithium iodide is attached to an entire surface of the positive electrode 20 including the catalyst 20b.

Figure 13:
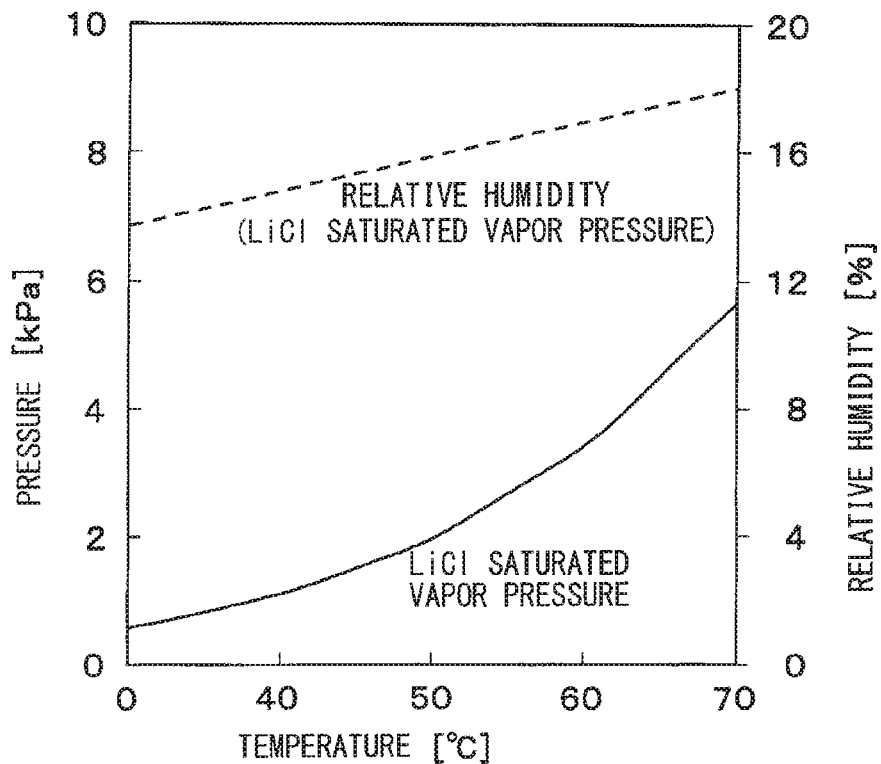
FIG. 13 is a diagram showing a saturated vapor pressure of a saturated aqueous lithium chloride solution according to a fourth embodiment.
Figure 14:
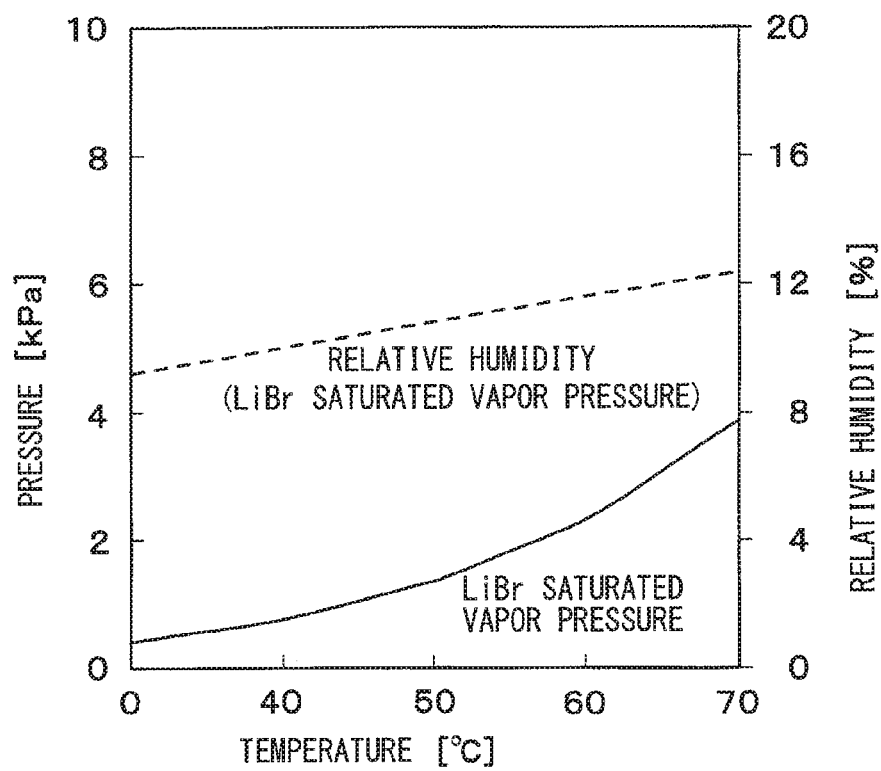
FIG. 14 is a diagram showing a saturated vapor pressure of an aqueous lithium bromide solution according to the fourth embodiment.
Figure 15:
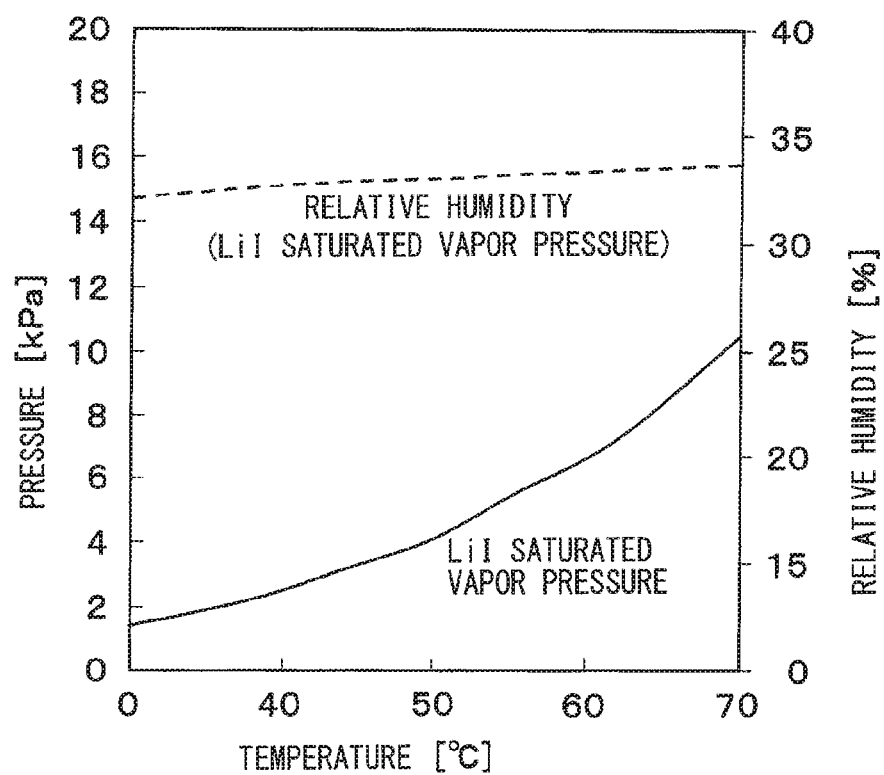
FIG. 15 is a diagram showing a saturated vapor pressure of a saturated aqueous lithium iodide solution according to the fourth embodiment.

FIG. 13 shows a saturated vapor pressure (hereinafter referred to as LiCl saturated vapor pressure) when the aqueous lithium chloride solution becomes a saturated aqueous solution, and a humidity corresponding to the LiCl saturated vapor pressure. FIG. 14 shows a saturated vapor pressure (hereinafter referred to as LiBr saturated vapor pressure) when an aqueous lithium bromide solution becomes a saturated aqueous solution, and a humidity corresponding to the LiBr saturated vapor pressure. FIG. 15 shows a saturated vapor pressure (hereinafter referred to as LiI saturated vapor pressure) when an aqueous lithium iodide solution becomes a saturated aqueous solution, and a humidity corresponding to the LiI saturated vapor pressure.

As shown in FIG. 13, the humidity corresponding to the LiCl saturated vapor pressure is around 15% in a temperature range of 30 to 70° C. For that reason, when the aqueous lithium chloride solution is used as the surface ion conductive layer 24, it is desirable to set the humidity of the supply gas to 10% or more in order to prevent the contraction of the surface ion conductive layer 24. Further, when the aqueous lithium chloride solution is used as the surface ion conductive layer 24, it is desirable to set the humidity of the supply gas to 20% or less in order to prevent the expansion of the surface ion conductive layer 24.

As shown in FIG. 14, the humidity corresponding to the LiBr saturated vapor pressure is around 10% in the temperature range of 30 to 70° C. For that reason, when the aqueous lithium bromide solution is used as the surface ion conductive layer 24, it is desirable to set the humidity of the supply gas to 5% or more in order to prevent the contraction of the surface ion conductive layer 24. Further, when the aqueous lithium bromide solution is used as the surface ion conductive layer 24, it is desirable to set the humidity of the supply gas to 15% or less in order to prevent the expansion of the surface ion conductive layer 24.

As shown in FIG. 15, the humidity corresponding to the LiI saturated vapor pressure is around 33% in the temperature range of 30 to 70° C. For that reason, when the aqueous lithium iodide solution is used as the surface ion conductive layer 24, it is desirable to set the humidity of the supply gas to 25% or more in order to prevent the contraction of the surface ion conductive layer 24. Further, when the aqueous lithium iodide solution is used as the surface ion conductive layer 24, it is desirable to set the humidity of the supply gas to 40% or less in order to prevent the expansion of the surface ion conductive layer 24.

Figure 16:
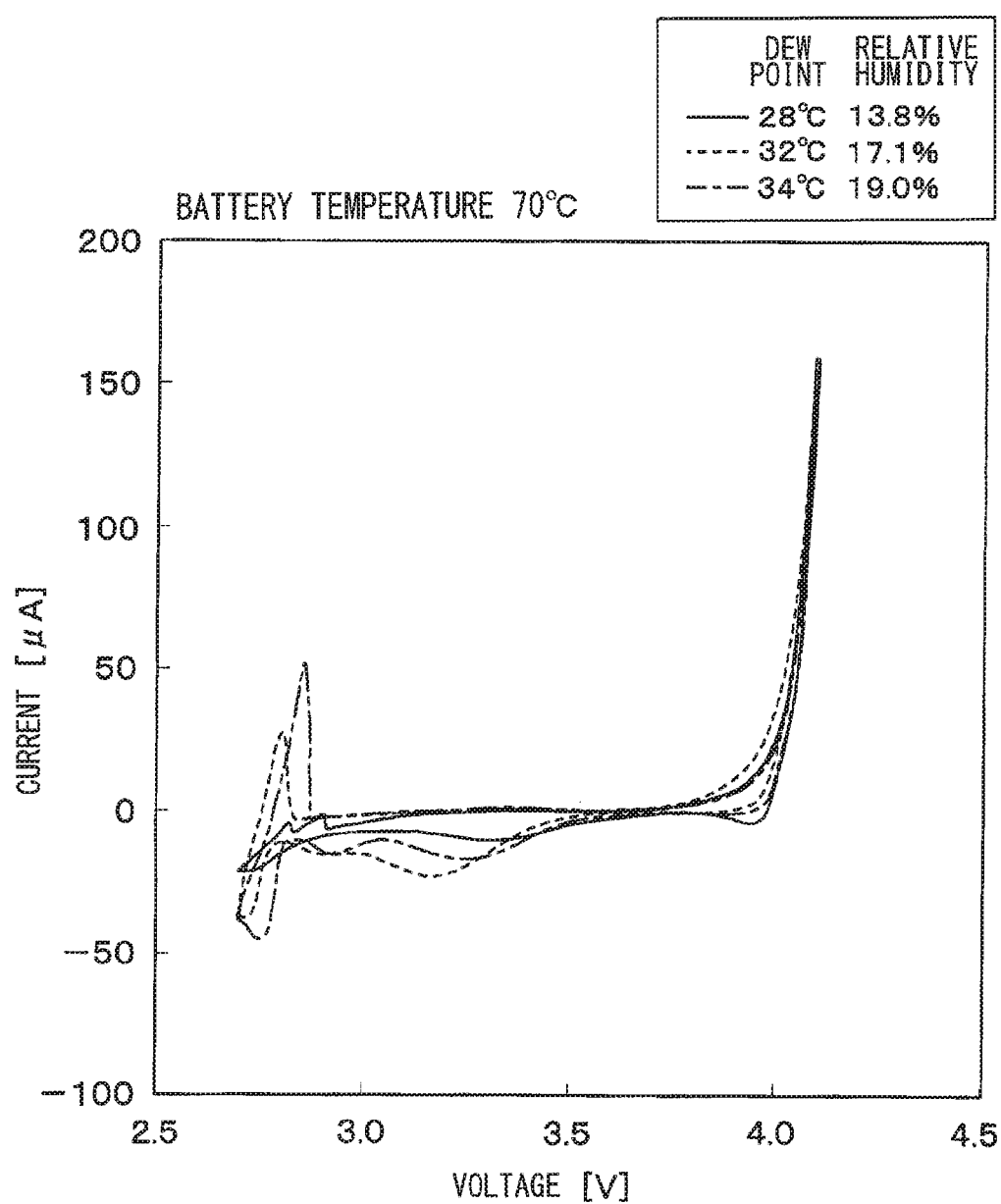
FIG. 16 is a diagram showing charging and discharging characteristics of a lithium air battery at a battery temperature of 70° C. according to the fourth embodiment.

FIG. 16 shows charging and discharging characteristics when the humidity of the supply gas is changed to humidity corresponding to different dew points (in this example, 28° C., 32° C., 34° C.) at the battery temperature of 70° C. in the air battery 2 using the aqueous lithium chloride solution as the surface ion conductive layer 24. The humidity at 70° C. corresponding to the dew point of 28° C. is 13.8%, the humidity at 70° C. corresponding to the dew point of 32° C. is 17.1%, and the humidity at 70° C. corresponding to the dew point of 34° C. is 19.0%.

As shown in FIG. 16, the excellent charging and discharging characteristics can be obtained by controlling the humidity of the supply gas corresponding to each dew point at 10% or more at the battery temperature of 70° C. In particular, the excellent charging and discharging characteristics can be obtained when the humidity of the supply gas is controlled to be equal to or higher than the humidity corresponding to the dew point of 32° C.

Figure 17:
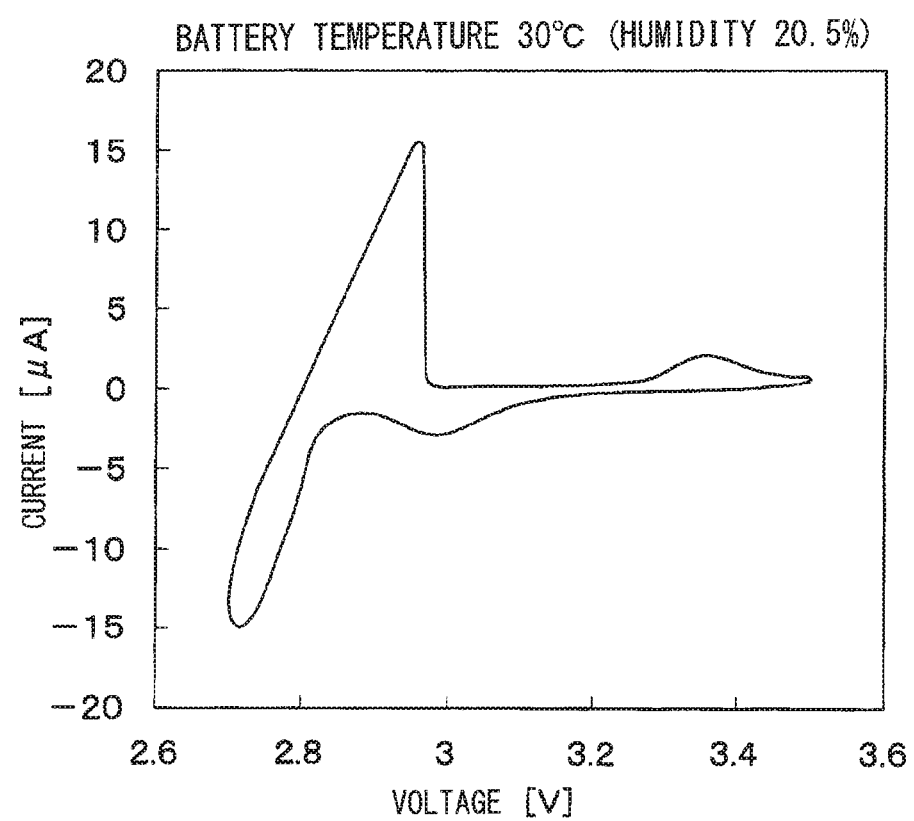
FIG. 17 is a diagram showing charging and discharging characteristics of the lithium air battery at the battery temperature of 30° C. according to the fourth embodiment.

FIG. 17 shows charging and discharging characteristics when the humidity of the supply gas is set to 20.5% at the battery temperature of 30° C. in the air battery 2 using the aqueous lithium chloride solution as the surface ion conductive layer 24. As shown in FIG. 15, the excellent charging and discharging characteristics can be obtained by controlling the humidity of the supply gas at 10% or more at the battery temperature of 30° C. Also, under the conditions shown in FIG. 17, the charge and discharge of the air battery 2 are repeated 10 cycles, as a result of which it is confirmed that the charge and discharge show almost the same current voltage change. In other words, even if charge and discharge of the air battery 2 are repeated, the deterioration of the charging and discharging characteristics of the air battery 2 does not occur.

According to the fourth embodiment described above, even when the aqueous lithium chloride solution, the aqueous lithium bromide solution or the aqueous lithium iodide solution is used as the surface ion conductive layer 24, the humidification amount of the supply gas is controlled based on the battery temperature, thereby being capable of properly maintaining the surface ion conductive layer 24 in correspondence with a change in the battery temperature. This makes it possible to stably charge and discharge the air battery 2 within the operating temperature range of the air battery 2.

Other Embodiments (1) In the first embodiment described above, lithium hydroxide is generated by the lithium contained in the reaction product 23 and the gaseous water contained in the supply gas, but the present disclosure is not limited to the above configuration, but solid lithium hydroxide may be attached to the surface of the positive electrode 20 in advance. It is desirable that the solid lithium hydroxide is attached to the entire surface of the positive electrode 20 including the catalyst 20b. The solid lithium hydroxide aqueous solution absorbs gaseous water contained in the supply gas into the aqueous lithium hydroxide solution, and the surface ion conductive layer 24 can be formed.

(2) In the respective embodiments described above, the air battery 2 is configured as a single cell. However, the air battery 2 is not limited to the single cell, and the air battery 2 may be configured as a stacked air battery in which multiple cells are stacked on each other.

(3) In the first embodiment, the supply gas is humidified by the humidification device configuring the humidity adjustment device 6, but the humidity adjustment device 6 has only to adjust the humidity of the supply gas, and may dehumidify the supply gas by the humidity adjustment device 6.

(4) In the second embodiment described above, the temperature adjusting device 9 for adjusting the temperature of the air battery 2 is provided. However, if there is no need to cool the air battery 2, the radiator 9d may be omitted, and if there is no need to heat the air battery 2, the heater 9e may be omitted.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A lithium air battery system comprising:
a lithium air battery that includes a negative electrode made of a negative electrode material for absorbing and releasing a lithium ion, a positive electrode made of a positive electrode material and including a catalyst for reducing oxygen which is positive electrode active material, and a solid electrolyte layer including a solid electrolyte interposed between the negative electrode and the positive electrode; and
a humidity control unit that adjusts a humidity of gas which includes oxygen and contacts with at least the positive electrode,
wherein:
the humidity control unit adjusts the humidity of the gas based on a temperature of the lithium air battery at least during operation of the lithium air battery;
a lithium ion conductive layer made of a lithium compound is disposed on a surface of the positive electrode under a condition that water in a gas phase is disposed in the gas;
the humidity control unit controls the humidity of the gas based on a saturated vapor pressure of a saturated aqueous solution of the lithium compound at a temperature of the lithium air battery,
the lithium air battery is accommodated in a container, and
the humidity control unit is disposed in the container, and includes a same kind of lithium compound aqueous solution as the lithium ion conductive layer.

2. The lithium air battery system according to claim 1, wherein:
the humidity control unit controls the humidity of the gas to be lower than a saturated water vapor amount at the temperature of the lithium air battery.

3. The lithium air battery system according to claim 1, wherein:
the humidity control unit decreases the humidity of the gas in a case of stopping the operation of the lithium air battery to be lower than the humidity of the gas in a case of operating the lithium air battery.

4. The lithium air battery system according to claim 1, wherein:
the humidity control unit includes a humidification device that humidifies the gas, and
the humidity control unit controls a humidification amount by the humidification device to adjust the humidity of the gas.

5. The lithium air battery system according to claim 1, further comprising:
a temperature detection unit that detects the temperature of the lithium air battery, wherein:
the humidity control unit includes a control unit that controls the humidity of the gas based on the temperature detected by the temperature detection unit.

6. The lithium air battery system according to claim 1, wherein:
the humidity control unit adjusts and controls the humidity of the gas to maintain a ratio between the humidity of the gas and the saturated vapor pressure of the saturated aqueous solution of the lithium compound to be constant when the temperature of the lithium air battery changes.

7. The lithium air battery system according to claim 1, wherein:
the humidity control unit controls the humidity of the gas to control the lithium ion conductive layer to have an ion conductivity corresponding to a desired charge and discharge density.

8. The lithium air battery system according to claim 1, wherein:
the lithium compound is lithium hydroxide.

9. The lithium air battery system according to claim 8, wherein
the humidity control unit controls the humidity of the gas to control a relative humidity of the gas to be in a range between 60% and 90%.

10. The lithium air battery system according to claim 1, wherein:
the lithium compound is lithium chloride.

11. The lithium air battery system according to claim 10, wherein
the humidity control unit controls the humidity of the gas to control a relative humidity of the gas to be equal to or higher than 10%.

12. The lithium air battery system according to claim 1, wherein:
the lithium compound is lithium bromide.

13. The lithium air battery system according to claim 12, wherein:
the humidity control unit controls the humidity of the gas to control a relative humidity of the gas to be equal to or higher than 5%.

14. The lithium air battery system according to claim 1, wherein
the lithium compound is lithium iodide.

15. The lithium air battery system according to claim 14, wherein
the humidity control unit controls the humidity of the gas to control a relative humidity of the gas to be equal to or higher than 25%.

16. The lithium air battery system according to claim 1, wherein:
the humidity control unit includes a battery temperature adjustment unit that adjusts the temperature of the lithium air battery; and
the humidity control unit adjusts the temperature of the lithium air battery by the battery temperature adjustment unit to control the humidity of the gas.

* * * * *